United States Patent [19]

Ferranto

[11] Patent Number: 4,518,140

[45] Date of Patent: May 21, 1985

[54] DRAWING BOARD ASSEMBLY

[76] Inventor: John J. Ferranto, 1730 Diego Way, Oxnard, Calif. 93030

[21] Appl. No.: 142,431

[22] Filed: Apr. 21, 1980

[51] Int. Cl.[3] ........................ A47G 1/24; C09D 11/00

[52] U.S. Cl. ...................................... 248/456; 108/32; 248/460

[58] Field of Search .................. 108/32; 248/456, 460, 248/496

[56] References Cited

U.S. PATENT DOCUMENTS

| | | | |
|---|---|---|---|
| 1,401,458 | 12/1921 | Boon | 248/456 |
| 1,920,452 | 8/1933 | Wagner | 108/32 |
| 2,003,746 | 6/1935 | Headington | 248/456 |
| 2,969,607 | 1/1961 | Grumbacher | 248/456 |

FOREIGN PATENT DOCUMENTS

| | | | |
|---|---|---|---|
| 43751 | of 1908 | Switzerland | 248/496 |

*Primary Examiner*—W. C. Reynolds
*Attorney, Agent, or Firm*—Jack C. Munro

[57] ABSTRACT

The drawing board assembly which is constructed to facilitate portability and also to facilitate usage which takes the form of a base, a backing board and a drawing board. The backing board is adjustable to various inclined positions in respect to the base. The drawing board is to be releasably, pivotally mounted on the exterior surface of the backing board so that the drawing board can be pivoted to any desirable position in respect to the backing board. A storage container for painting or drawing materials is mounted on the upper surface of the base. When in the collapsed, transporting position, the drawing board is located parallel to the upper surface of the base enclosing the storage chamber with the inner surface of the backing board being positioned against the drawing board.

6 Claims, 6 Drawing Figures

Fig. 1
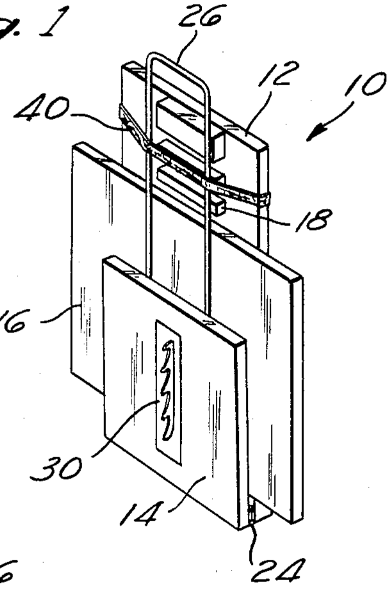
Fig. 2
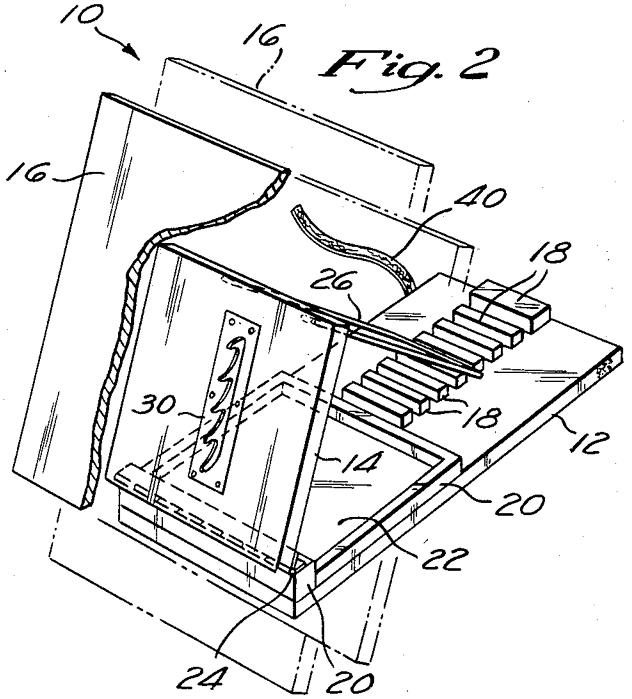
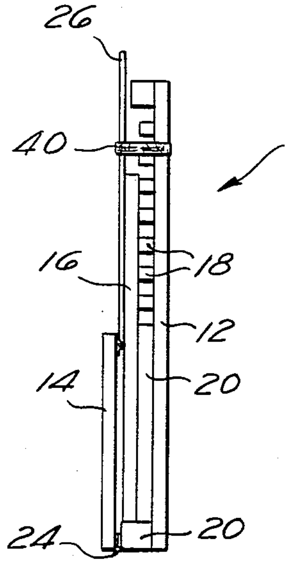
Fig. 3
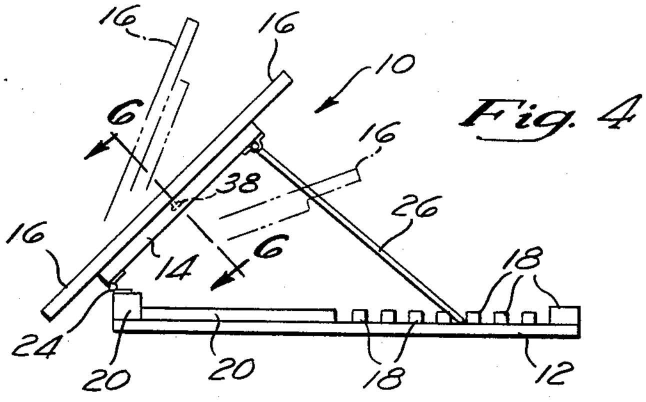
Fig. 5
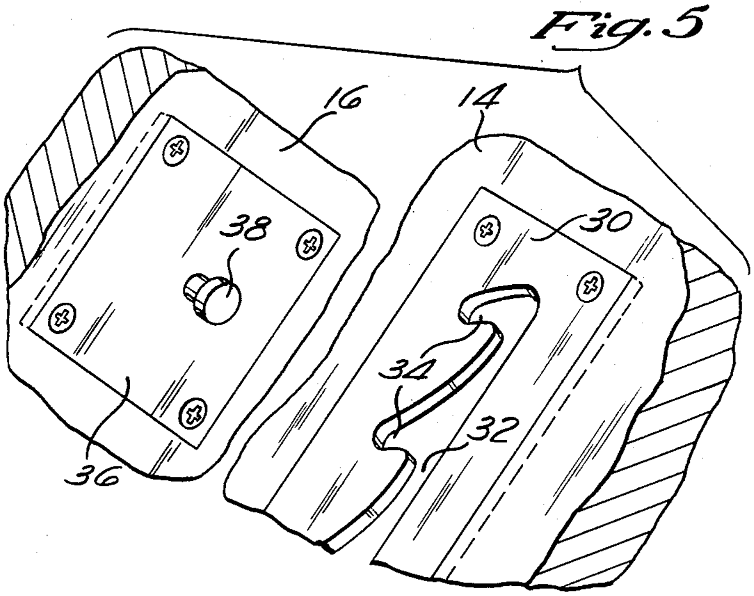
Fig. 6
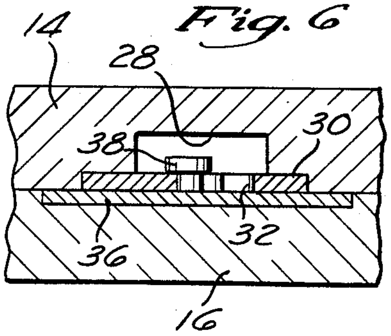

DRAWING BOARD ASSEMBLY

BACKGROUND OF THE INVENTION

The field of this invention relates to artists tools and more particularly to a drawing board assembly which facilitates usage of the drawing board by permitting the drawing board to be located at various positions.

Artists not only create drawings and paintings within a studio but also may move to another site or an outdoor site and possibly even on a vehicle, such as a boat, train or the like. In order for the artist to create such a drawing or painting, certain tools are required. Typical tools are some form of an easel, brushes, paints, etc. There is a need for some type of a drawing board assembly which facilitates portability and also includes some type of a storage chamber which facilitates containing of artists materials.

Previously, there have been attempts at designing drawing board assemblies. However, these drawing board assemblies have been rather complex in construction and bulky in size. Also, the drawing board assemblies of the prior art have not been readily adjustable to various positions as in the creating of a drawing, it is normally preferred to position the drawing in various positions in order to make it easier to draw certain portions of the drawing.

SUMMARY OF THE INVENTION

The structure of this invention comprises a compact assembly which takes the form of a base which is adapted to be placed upon a planar supportive surface, such as a table. The upper surface of the base includes a plurality of spaced apart stop members and also a storage chamber for painting articles. A backing board is hingedly connected to the base at one edge thereof. A brace is also hingedly connected to the backing board. The brace is adapted to engage any one of the stop members thereby supporting the backing board at various inclined positions (depending on which stop member is engaged by the brace) in respect to the base. Substantially centrally mounted within the exterior surface of the backing board is a pivot means in the form of an elongated slot having a plurality of spaced apart transverse slots extending therefrom. A separate drawing board is included which has a front side and a back side wherein the front side is to be used to support a drawing or painting. Extending from the back side of the drawing board at approximately the center of gravity of the drawing board is a pivot pin. The pivot pin is to engage with any one of the transverse slots of the pivot means. The drawing board is then pivotable to any desired position with respect to the backing board. Depending upon which transverse slot of the pivot means the pivot pin is engaged with, the overall spacing of the drawing board from the base can be varied. The entire drawing board assembly is collapsible into a single unit with the drawing board itself being then located between the backing board and the base enclosing the storage chamber to prevent accidental dislodgement of any stored articles. A tie down strap is employed to interlock the drawing board assembly into a single collapsed unit when it is in the collapsed position.

BRIEF DESCRIPTION OF THE DRAWING

FIG. 1 is an isometric view of the drawing board assembly of this invention showing the drawing board in the collapsed position;

FIG. 2 is an isometric view, partially cut-away, showing the drawing board assembly of this invention in the operating position;

FIG. 3 is an end view of the drawing board assembly when in the collapsed position;

FIG. 4 is an end view of the drawing board assembly of this invention when in the operating position shown within FIG. 2;

FIG. 5 is an exploded, segmental view showing the pivot assembly between the drawing board and the backing board employed within the drawing board assembly of this invention; and FIG. 6 is a cross-sectional view through the connection between the drawing board and the backing board assembly of this invention taken along line 6—6 of FIG. 4.

DETAILED DESCRIPTION OF THE SHOWN EMBODIMENT

Referring particularly to the drawing, there is shown the drawing board assembly 10 of this invention which is constructed basically of a base 12, backing board 14 and a drawing board 16. Each of the base 12, backing board 14 and drawing board 16 are constructed of sheet material and can be wood, plastic, or any other rigid material.

The base 12 has a lower surface which is adapted to be positioned on a planar supportive surface such as a table. The upper surface of the base 12 includes a plurality of separate stop members 18 which extend to the aft edge of the base 12. There is to be a gap between each adjacent pair of stop members 18. In the illustrative embodiment shown within the drawings, it is to be noted that there are eight in number of stop members 18. However, the number of stop members can be greater or larger without departing from the scope of this invention.

Also mounted on the upper surface of the base 12 is a wall assembly 20 which forms an enclosed compartment 22. Within the compartment 22 there is to be located typical painting or drawing materials, such as brushes, pens, pencils, paints, etc.

Secured to a portion of the wall assembly 20 at the fore edge of the base 12 is a hinge 24. The hinge 24 is also fixedly secured to the back side of the backing board 14. Therefore, it can be seen that the backing board 14 can be moved to various angular positions with respect to the base 12 as is shown within FIG. 4 of the drawing. Also, it is to be understood that the backing board 14 may occupy a parallel position with respect to the base 12 as is shown within FIGS. 1 and 3 of the drawing. This latter position is known as the collapsed position wherein the former position would be known as a usable or operating position.

Also hingedly connected to the backside of the backing board 14 is a bifurcated brace member 26. The outer end of the brace member 26 is capable of being located within any gap between an adjacent pair of stop members 18. Depending upon which gap the brace member 26 is located within, the backing board 14 assumes a different inclined position with respect to the base 12.

Within the front side of the backing board 14 is an elongaged recess 28. Fixedly mounted over the recess 28 to the backing board 14 is a plate 30. The plate 30 includes an elongated slot 32 which has a plurality of spaced apart transverse slots 34 depending therefrom. With the backing board 14 located at any inclined position, it is to be noted that the location of each of the slots 34 is so that each slot 34 extends in a downward (toward the base 12) direction. The closed bottom of each slot 34 is nearest the base 12 as opposed to the open upper end of each slot 34.

The outer surface of the drawing board 16 includes an operating surface to which is to be attached a drawing or painting (not shown). The backside of the drawing board 16 has mounted thereon a metallic plate 36. Extending from the metallic plate 36 is a pivot pin 38 which has an enlarged head. The enlarged head of the pivot pin 38 is to be readily passable through the slot 32. However, once the pivot pin 38 is guided to within a transverse slot 34, the enlarged head of the pivot pin prevents disassociation of the drawing board 16 from the backing board 14.

It is to be noted that the pivot pin 38 can be positioned within any one of the transverse slots 34 thereby adjusting the height of the drawing board 16 in respect to the planar supportive surface upon which it is supported. This is only for reasons of personal preference for the particular individual doing the painting or drawing. It is also to be noted that when the pivot pin 38 is engaged with any slot 34, that the drawing board 16 can be readily pivoted three hundred and sixty degrees in respect to the backing board 14. This means that the drawing board 16 can be positioned at one particular pivoted position in respect to the backing board 14 and then repositioned at any other desired pivoted position which would be desired for the making of a particular part of the drawing or painting. It is also to be noted that since the pivot pin 38 is centrally located (located at the center of gravity of the drawing board 16), that once a particular pivoted position is established, the drawing board 16 will remain in that position.

In order to facilitate portability of the drawing board assembly 10, the drawing board 16 may be disengaged from the backing board 14 by having the pivot pin 38 moved into slot 32 and then moving the drawing board 16 outwardly away from the backing board 14. The drawing board 16 is then to be located on top of the wall assembly 20 as is shown within FIGS. 1 and 3 of the drawing. The brace 26 has been disengaged from any stop member 18 and the backing board 14 is then moved so it abuts against the drawing board 16. The brace is then located at an extended position substantially parallel to the base 12. In order to maintain the drawing board assembly in the collapsed position, a tie down strap 40 is connected to the base 12 and is adapted to be located about the brace 26. The function of the strap 40 is to maintain the assembly 10 in the collapsed state when such is desired. With the drawing board assembly 10 in the collapsed state, the brace 26 functions as a carrying handle to facilitate portability.

What is claimed is:

1. A drawing board assembly comprising:

a base, said base having a fore edge and an aft edge and an upper surface and a lower surface, said lower surface adapted to be located upon a planar supportive surface, said upper surface including stop means;

a backing board having a front side and a back side, said back side being hingedly connected to said upper surface at said fore edge, said front side including pivot means;

brace means connected to said back side of said backing board, said brace means to releasably engage with said stop means causing said backing board to assume an inclined position relative to said base, when said drawing board assembly is to not be in use said brace means is to be disengaged from said stop means permitting said backing board to be parallel and directly adjacent said base;

a drawing board having a front side and a back side, said front side being adapted to function as an operating surface, a pivot pin centrally mounted on said back side, said pivot pin adapted to releasably connect with said pivot means permitting pivoting of said drawing board relative to said backing board solely upon application of sufficient manual force; and said pivot means comprising a plurality of separate pivoting points, said pivot pin being capable of connecting with any one of said pivoting points thereby adjusting the location of said drawing board in respect to said backing board, each said pivoting point being formed by a transverse slot with there being a plurality of said transverse slots located in a spaced apart manner, each said transverse slot having an open upper end and a closed lower end, said closed lower end of each said transverse slot being located nearer said base than its respective said upper end when said backing board is in said inclined position relative to said base, said upper ends being connected together by an elongated slot, a pivoting point being when said pivot pin is located directly adjacent a said closed lower end.

2. The drawing board assembly as defined in claim 1 wherein:

said stop means including a plurality of separate stop locations, said brace means to be engageable with each said stop location thereby causing said backing board to assume various inclined positions relative to said base.

3. The drawing board assembly as defined in claim 2 wherein:

said brace means being hingedly connected to said back side of said backing board.

4. The drawing board assembly as defined in claim 3 wherein:

with said brace means disengaged from said stop means and said backing board being located directly adjacent said base said brace means functions as a handle to facilitate portability of said drawing board assembly.

5. The drawing board assembly as defined in claim 4 including:

tie down means connected between said brace means and said base, said tie down means to secure together said brace means and said base when said brace is disengaged from said stop means and said backing board is located directly adjacent said base.

6. The drawing board assembly as defined in claim 5 including:

a storage chamber mounted on said base, with said brace means disengaged from said stop means and said backing board is located directly adjacent said base said drawing board to be locatable between said backing board and said base enclosing said storage chamber.

* * * * *